(12) United States Patent
Ng et al.

(10) Patent No.: US 12,459,832 B2
(45) Date of Patent: Nov. 4, 2025

(54) MODERATELY DISPERSED NANO $Dy_2O_3$

(71) Applicant: Neo Performance Materials (Singapore) Pte. Ltd., Singapore (SG)

(72) Inventors: Szu Hwee Ng, Singapore (SG); Suzi Deng, Singapore (SG)

(73) Assignee: NEO Performance Materials (Singapore) PTE. LTD., Singapore (SG)

(*) Notice: Subject to any disclaimer, the term of this patent is extended or adjusted under 35 U.S.C. 154(b) by 672 days.

(21) Appl. No.: 17/770,989

(22) PCT Filed: Oct. 23, 2020

(86) PCT No.: PCT/IB2020/000904
§ 371 (c)(1),
(2) Date: Apr. 21, 2022

(87) PCT Pub. No.: WO2021/079193
PCT Pub. Date: Apr. 29, 2021

(65) Prior Publication Data
US 2022/0388857 A1 Dec. 8, 2022

Related U.S. Application Data

(60) Provisional application No. 62/925,160, filed on Oct. 23, 2019.

(51) Int. Cl.
*C01F 17/206* (2020.01)
*C01F 1/00* (2006.01)

(52) U.S. Cl.
CPC ............. *C01F 17/206* (2020.01); *C01F 1/00* (2013.01); *C01P 2004/62* (2013.01); *C01P 2006/80* (2013.01)

(58) Field of Classification Search
CPC ........ C01F 17/206; C01F 1/00; C01F 17/224; C01P 2004/62; C01P 2006/80;
(Continued)

(56) References Cited

U.S. PATENT DOCUMENTS

| | | |
|---|---|---|
| 6,677,262 B2 | 1/2004 | Wataya et al. |
| 2009/0170961 A1 | 7/2009 | Yang et al. |
| 2010/0019201 A1 | 1/2010 | Puppe et al. |

FOREIGN PATENT DOCUMENTS

| | | |
|---|---|---|
| CN | 108975378 A | 12/2018 |
| JP | H0797212 A | 4/1995 |

(Continued)

OTHER PUBLICATIONS

Happy, A. I. Y. Tok, F. Y. C. Boey, R. Huebner, and S. H. Ng, Synthesis of dysprosium oxide by homogeneous precipitation, 2006, J Electroceram, 17, 75-78 (Year: 2006).*

(Continued)

*Primary Examiner* — Daniel C. McCracken
*Assistant Examiner* — Joshua Maxwell Speer
(74) *Attorney, Agent, or Firm* — Melissa M. Hayworth; E. Joseph Gess; Merchant & Gould, P.C.

(57) ABSTRACT $Dy_2O_3$ particles of a nanoparticle scale have beneficial properties for ceramic and electronic uses. Disclosed herein are moderately dispersed $Dy_2O_3$ particles having regular morphology and lateral size ranging from about 10 nm to 1 μm. The $Dy_2O_3$ particles may exhibit a narrow particle size distribution such that the difference between $D_{10}$ and $D_{90}$ is about 0.1 μm to 1 μm. Further disclosed are processes of producing these moderately dispersed $Dy_2O_3$ particles. These processes do not include grinding to obtain the particles. Also disclosed herein are uses for these $Dy_2O_3$μ particles.

12 Claims, 9 Drawing Sheets

(58) Field of Classification Search
CPC .............. C01P 2002/72; C01P 2004/03; C01P 2004/04; C01P 2004/32; C01P 2004/38; C01P 2004/51; C01P 2004/64
See application file for complete search history.

(56) References Cited

FOREIGN PATENT DOCUMENTS

| | | |
|---|---|---|
| JP | 2008044833 A | 2/2008 |
| JP | 2009161425 A | 7/2009 |
| JP | 2015030663 A | 2/2015 |
| JP | 2020123619 A | 8/2020 |
| JP | 2022067632 A | 5/2022 |

OTHER PUBLICATIONS

Happy, A. I. Y Tok, L. T. Su, F. Y. C. Boey, and S. H. Ng, Homogeneous Precipitation of Dy2O3 Nanoparticles-Effects of Synthesis Parameters, 2007, Journal of Nanoscience and Nanotechnology vol. 7, 907-915 (Year: 2007).*

International Search Report and Written Opinion mailed Mar. 12, 2021 in PCT/IB2020/000904.

Jung Eui Young et al., "Synthesis of rare earth oxide nanoplates with single unit cell thickness using a thermal decomposition method", Korean Jr. of Chemical Engineering, Springer NY LLC, US, KR, vol. 33, No. 2, Aug. 17, 2015, pp. 683-687, Experimental Section, Conclusion, Fig. 3.

Barshutina M.N., et al., "Pulsed Laser Ablation for Obtaining Contrast Agents Based on Dysprosium Oxide (Dy2O3) Nanoparticles", Measurement Techniques, Consultants Bureau, New York, US vol. 60, No. 3, Jul. 25, 2017, pp. 216-219, Figs. 2-3.

Happy A. I. Y. Tok, et al, "Synthesis of dysprosium oxide by homogeneous precipitation", Jr. Electroceramics, Kluwer Academic Publishers, BO, vol. 17, No. 1, Sep. 1, 2006, pp. 75-78, conclusions, figures.

Deng, S. et al., "Reduced Graphene Oxide Conjugated Cu2O Nanowire Mesocrystals for High-Performance NO2 Gas Sensor", J. Am. Chem. Soc., 2012, 134(10), pp. 4905-4917.

Office Action dated Jun. 7, 2023 issued in equivalent Chinese Application No. 202080079744.0.

Japanese Office Action and English-language Translation for JP2022-523892, dated Feb. 2, 2024, 18 pgs.

* cited by examiner

FIG. 7A
FIG. 7B
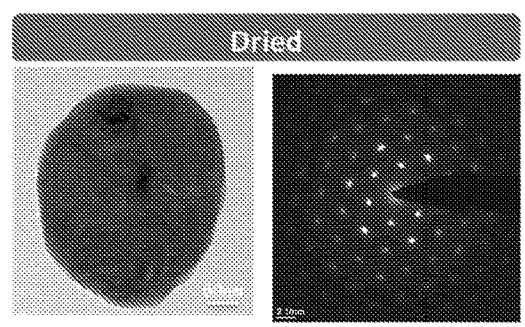
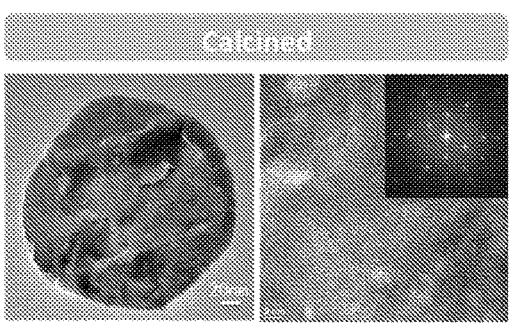
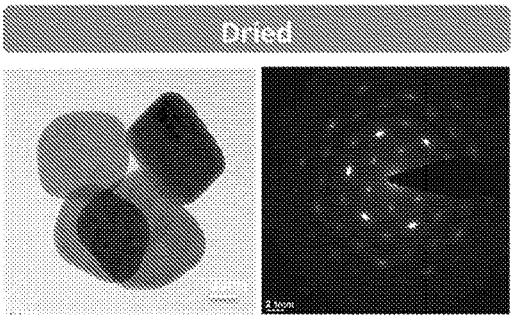
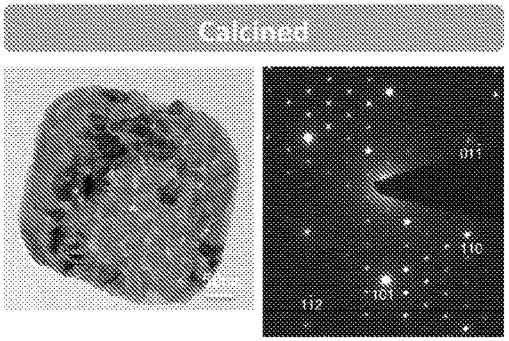
FIG. 8A
FIG. 8B

MODERATELY DISPERSED NANO $Dy_2O_3$

RELATED APPLICATIONS

The present application is a U.S. National Stage filing under 35 U.S.C. § 371 of International Application No. PCT/IB2020/000904 filed 23 Oct. 2020, which claims priority to U.S. Application No. 62/925,160 filed 23 Oct. 2019.

This application relates to moderately dispersed $Dy_2O_3$ particles having regular morphology and desirably small lateral sizes. These lateral sizes may range from about 10 nm to 1 µm. Also disclosed herein are processes of producing the moderately dispersed $Dy_2O_3$ particles and uses for same.

INTRODUCTION

Dysprosium Oxide ($Dy_2O_3$) is a sesquioxide compound of the rare earth metal dysprosium. It has specialized uses in ceramics, glass, phosphors, lasers, and in multilayer ceramic capacitors. In particular, it has uses as a photoluminescent and thermoluminescent material, in magnetic resonance imaging as a contrast agent, as well as an additive to the dielectric barium titanate component of multilayer ceramic capacitors to improve the electrostatic capacity.

In these uses, there is a need for small particle size dysprosium oxide achieved without grinding. Particle sizes for dysprosium oxide are generally approximately 7-8 microns.

Increasing efforts have been devoted to the preparation of nano-$Dy_2O_3$ materials, whose size, shape, crystal structure and surface chemistry meet the requirements of such technological applications.

A challenging issue is achieving a high yield synthesis of nano-$Dy_2O_3$ with precise control over the morphology (size, shape, surface chemistry, particle size dispersion, etc.). U.S. Pat. No. 6,677,262 discloses syntheses of narrowly dispersed $Dy_2O_3$ at low concentrations of precursor (8-10 g/L) via a urea route. However, the resultant yield of product was low. To synthesize $Dy_2O_3$ at high yields, the precursor concentrations must be greatly increased. However, at such high concentrations, the intermediates undergo further growth via Ostwald ripening or oriented attachment growth. See S. Deng et al., "Reduced Graphene Oxide Conjugated $Cu_2O$ Nanowire Mesocrystals for High-Performance $NO_2$ Gas Sensor", *J. Am. Chem. Soc.*, 2012, 134(10), pp. 4905-4917. As such, the synthesized $Dy_2O_3$ does not retain the desired discrete and well-dispersed particles. Utilizing known syntheses, one cannot linearly extrapolate the concentration to produce nanoparticles at high yield due to the effect on the thermodynamics of particle growth.

Therefore, developing a simple and efficient method to prepare dispersed $Dy_2O_3$ at high yields remains needed.

SUMMARY

As disclosed herein, the present compositions comprise moderately dispersed $Dy_2O_3$ particles having regular morphology and lateral size ranging from about 10 nm (0.01 µm) to 1000 µm. In certain embodiments, the present compositions comprise moderately dispersed $Dy_2O_3$ particles having regular morphology and lateral size ranging from about 10 nm to 1 µm. In some embodiments, dispersed $Dy_2O_3$ particles have lateral size ranging from about 40 nm (0.04 µm) to 100 µm. In some embodiments, dispersed $Dy_2O_3$ particles have lateral size ranging from about 40 nm (0.04 µm) to 1 µm. In other embodiments, dispersed $Dy_2O_3$ particles have lateral size ranging from about 100 nm (0.1 µm) to 1 µm.

In any of these embodiments relating to lateral sizes, the $Dy_2O_3$ particles can have a relatively narrow particle size distribution such that the particles have a particle size distribution wherein $D_{10}$ and $D_{90}$ is about 0.1 µm to 1 µm.

The present processes of producing moderately dispersed $Dy_2O_3$ particles comprise: (a) mixing a dysprosium salt, polymeric additive, and chelating agent in water to provide a dysprosium precursor solution; (b) heating the dysprosium precursor solution to form a precipitate; and (c) calcining the precipitate to provide moderately dispersed $Dy_2O_3$ particles. From these processes, the moderately dispersed $Dy_2O_3$ particles can be isolated.

In embodiments of the process, the chelating agent can be selected from the group consisting of diethanolamine, 2-amino-2-(hydroxymethyl)-1,3-propanediol, triethanolamine, ethylenediamine, 6-aminohexanoic acid, L-histidine, L-lysine, and mixtures thereof.

In embodiments of the process, the polymeric additives can be selected from the group consisting of Polyvinylpyrrolidone (PVP), Poly(vinyl alcohol) (PVA), Polyethylenimine (PEI), and mixtures thereof.

Also disclosed herein are $Dy_2O_3$ particles made by this process. The process may provide for large scale production of these $Dy_2O_3$ particles and these processes may also provide for high yields. Importantly the processes do not include any grinding step.

BRIEF DESCRIPTION OF THE DRAWINGS

FIG. 7A is a Transmission Electron Micrograph (TEM) and selected area electron diffraction (SAED) pattern image of the dried precipitate using polyethylenimine (PEI) as the polymeric additive after hydrothermally reacting and drying.

FIG. 7B is a TEM and SAED of $Dy_2O_3$ using polyethylenimine as the polymeric additive after calcined.

FIG. 8A is a TEM and SAED image of dried precipitate using polyvinylalcohol (PVA) as the polymeric additive after hydrothermally reacting and drying.

FIG. 8B is a TEM and SAED of $Dy_2O_3$ using PVA as the polymeric additive after calcined.

DETAILED DESCRIPTION

Figure 1:
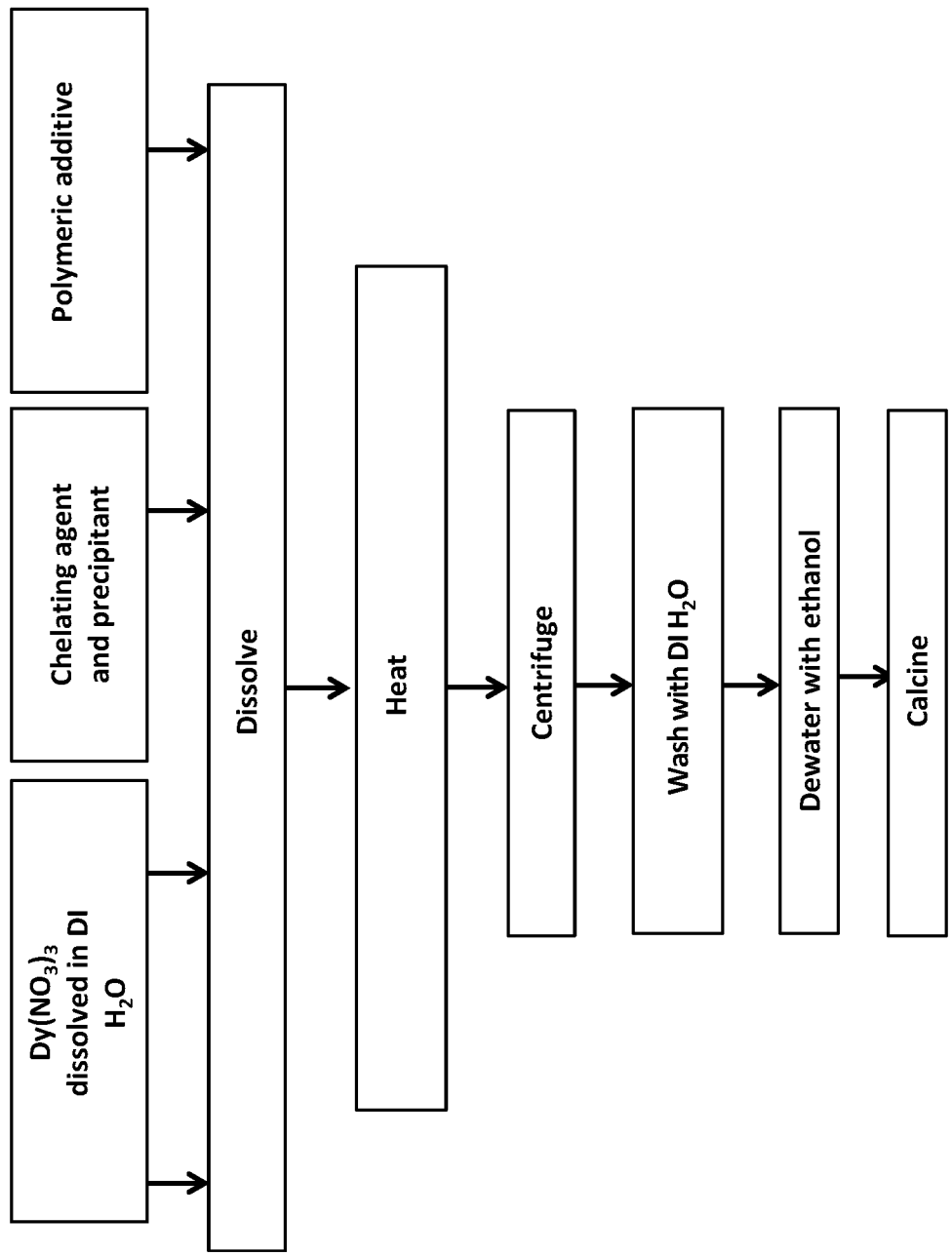
FIG. 1 illustrates a flowchart of an embodiment of the process of producing moderately dispersed $Dy_2O_3$ particles.

Before the moderately dispersed $Dy_2O_3$ particles and processes are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a", "an", and "the" include plural referents unless the context clearly dictates otherwise. Thus, for example, reference to "a step" may include multiple steps, reference to "producing" or "products" of a reaction or treatment should not be taken to be all of the products of a reaction/treatment, and reference to "treating" may include reference to one or more of such treatment steps. As such, the step of treating can include multiple or repeated treatment of similar materials/streams to produce identified treatment products.

Numerical values with "about" include typical experimental variances. As used herein, the term "about" means within a statistically meaningful range of a value, such as a stated particle size, concentration range, time frame, molecular weight, temperature, or pH. Such a range can be within an order of magnitude, typically within 10%, and even more typically within 5% of the indicated value or range. Sometimes, such a range can be within the experimental error typical of standard methods used for the measurement and/or determination of a given value or range. The allowable variation encompassed by the term "about" will depend upon the particular system under study, and can be readily appreciated by one of ordinary skill in the art. Whenever a range is recited within this application, every whole number integer within the range is also contemplated as an embodiment of the invention.

The present application relates to moderately dispersed $Dy_2O_3$ particles. Herein, dispersity is a measure of the heterogeneity (or uniformity) of particle sizes in a mixture. It can be indicated by the polydispersity index (PDI) parameter as derived from the dynamic light scattering (DLS) technique, which is commonly used to determine the size distribution of particles in suspension by measuring the fluctuations in intensity of the scattered light. Specifically, from the particle size distribution (PSD) profile, the mean and standard deviation (stddev) are obtained and expressed in the form of $(stddev/mean)^2$ to yield the PDI value. Information on this analysis technique also can be found at www.materials-talks.com/blog/2017/10/23/polydispersity-what-does-it-mean-for-dls-and-chromatography/, which is herein incorporated by reference as needed.

TABLE 1

Approximate values for dispersity parameters

| | | Distribution Type | | | |
|---|---|---|---|---|---|
| | | monodisperse | | polydisperse | |
| | Definition | uniform | narrow | moderate | broad |
| PDI from DLS | $=(stddev/mean)^2$ | 0.0 | 0.0-0.1 | 0.1-0.4 | >0.4 |

As illustrated in Table 1, the PDI value for a perfectly uniform sample is 0.0. As used herein, "moderately dispersed" means that the PDI value of $Dy_2O_3$ particles is in the range of about 0.1 to 0.4.

As used herein, "moderately dispersed $Dy_2O_3$ particles" means $Dy_2O_3$ particles having a particle size distribution wherein $D_{10}$ to $D_{90}$ is not more than about 1 μm. In some embodiments, the particles have a particle size distribution wherein $D_{10}$ and $D_{90}$ is about 0.1 μm to 1 μm.

As used herein, "regular morphology" means that the characteristics of particles, including their size, shape and structure, are clearly defined and common across different particles in the same batch. It includes small aspect ratio configurations, such as uniform spheres, ovals or cubes, as well as high aspect ratio configurations such as uniform rods or wires.

Figure 10:
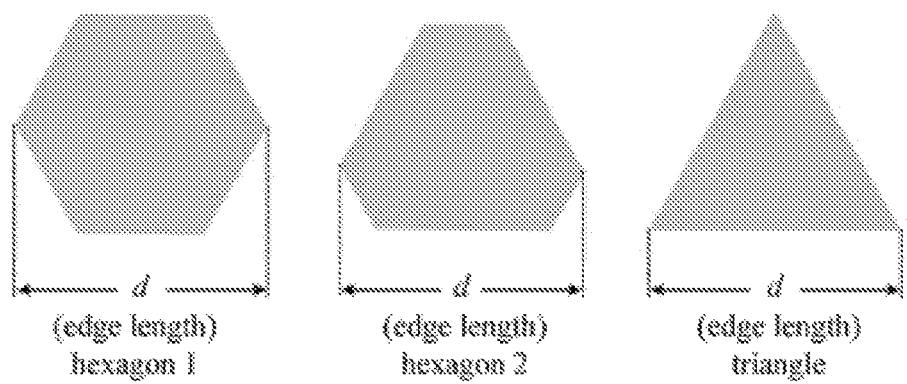
FIG. 10 is an illustration of lateral size.

As used herein, in two-dimensional nanostructures "lateral size" refers to the length extending from one side to the other side. FIG. 10 provides an illustration of lateral size and how it is measured. Herein, the lateral size of particles can be measured from electron microscopy images, specifically the transmission electron and scanning electron microscopy (TEM and SEM) images.

Disclosed herein is a composition comprising moderately dispersed $Dy_2O_3$ particles having regular morphology and lateral size ranging from about 10 nm (0.01 μm) to 1000 μm. In certain embodiments, the present compositions comprise moderately dispersed $Dy_2O_3$ particles having regular morphology and lateral size ranging from about 10 nm to 1 μm. In some embodiments, dispersed $Dy_2O_3$ particles have lateral size ranging from about 40 nm (0.04 μm) to 100 μm. In some embodiments, dispersed $Dy_2O_3$ particles have lateral size ranging from about 40 nm (0.04 μm) to 1 μm. In other embodiments, dispersed $Dy_2O_3$ particles have lateral size ranging from about 100 nm (0.1 μm) to 1 μm. In these embodiments of lateral size, the particles have a particle size distribution wherein $D_{10}$ and $D_{90}$ is about 0.1 μm to 1 μm.

In all of the above set forth embodiments relating to particle size distribution and lateral size, the $Dy_2O_3$ particles can have a $D_{10}$ of about 10 nm to 100 nm, a $D_{50}$ of about 0.1 μm to about 0.8 μm, and a $D_{90}$ of about 0.25 μm to 10 μm. In some embodiments, the $Dy_2O_3$ particles can have a $D_{10}$ of about 10 nm to 100 nm, a $D_{50}$ of about 0.1 μm to about 0.8 μm, and a $D_{90}$ of about 0.25 μm to 5 μm. In certain of these embodiments, the $Dy_2O_3$ particles can have a $D_{90}$ of about 0.25 μm to 1 μm.

In particular embodiments, the $Dy_2O_3$ particles have a $D_{50}$ of about 10 nm to 0.2 μm and a $D_{90}$ of about 0.2 μm to about 1 μm. In certain of these embodiments, the $Dy_2O_3$ particles have a $D_{50}$ of about 10 nm to 0.15 μm and a $D_{90}$ of about 0.2 μm to 0.75 μm.

The $Dy_2O_3$ particles disclosed herein can have a round or faceted shape, and do not agglomerate in any significant way. In addition, the $Dy_2O_3$ particles disclosed herein have a crystalline structure. In certain embodiments, the X-ray diffraction pattern of the $Dy_2O_3$ particles illustrates a single cubic phase, which can serve as a fingerprint for the periodic atomic arrangements in the material.

In any of the embodiments set forth above, the $Dy_2O_3$ particles also can have a low chloride content and in certain of these embodiments the chloride content can be about 0 to 50 ppm. Such low chloride content would prevent or reduce the likelihood of corrosion and is especially important for applications of the $Dy_2O_3$ particles in multilayer ceramic capacitors. Thus, achieving the low chloride content is an important characteristic of the $Dy_2O_3$ particles.

The moderately dispersed $Dy_2O_3$ particles as disclosed herein are made by a process comprising: (a) mixing a dysprosium salt, polymeric additive, and chelating agent in water to provide a dysprosium precursor solution; (b) heating the dysprosium precursor solution to form a precipitate; and (c) calcining the precipitate to provide moderately dispersed $Dy_2O_3$ particles. From this process, the moderately dispersed $Dy_2O_3$ particles as disclosed herein can be isolated.

It is important to note that the processes disclosed herein do not include a grinding or milling step. As such, the disclosed $Dy_2O_3$ particles are obtained without any grinding or milling step. Accordingly, the disclosed process provides the $Dy_2O_3$ particles as disclosed and described above.

The starting dysprosium salt is water soluble and in the process, the dysprosium salt is dissolved in water. The salts can be salts of inorganic or organic acids, for example chloride, sulfate, nitrate, acetate, and the like. In certain embodiments, the dysprosium salt can be either a chloride or nitrate salt. The starting dysprosium salt can affect the particle shape, particle size, and particle size distribution achieved.

The chelating agent used in the processes described herein can be any chelating agent. The chelating agents are organic compounds capable of linking metal ions to form chelates. In certain embodiments, the chelating agent can be advantageously selected from among diamines (e.g. ethylenediamine), alkanolamines (e.g. diethanolamine, 2-amino-2-(hydroxymethyl)-1,3-propanediol and triethanolamine) or amino acids (e.g. 6-aminohexanoic acid, L-histidine, L-lysine), and mixtures thereof. One or more chelating agents can also be present in the same reaction mixture. During calcination, the chelating agent is removed.

The polymeric additive can be any polymer that assists in processability of the dysprosium precursor solution and is removed during calcination. Herein, the role of the polymeric additive is to affect the particle size and morphology by providing selective surface stabilization and/or access to kinetically controlled growth conditions. The polymeric additive can be selected from the group consisting of Polyvinylpyrrolidone (PVP), Poly(vinyl alcohol) (PVA), Polyethyleneimine (PEI), and mixtures thereof.

The chelating agent and polymeric additive are dissolved in water when added to the process. The chelating agent may be added as a water mixture that is approximately 0.1 to 2 M, and in some embodiments about 0.5 to 1 M. The polymeric additive may be added as a water mixture that is approximately 2 to 15 g/L, and in some embodiments about 6.25 to 12.5 g/L.

For the addition to create the dysprosium precursor solution, the water mixtures of chelating agent, polymeric additive, and dysprosium salt can be added simultaneously or individually with mixing. Any order of addition can be utilized, if not added simultaneously. In some embodiments, about 2 to 3 moles of chelating agent are added per mole of dysprosium in step (a) of the process.

In certain embodiments, the dysprosium precursor solution of step (a) has a dysprosium concentration of about 0.2 mol/L to 1.5 mol/L.

The dysprosium precursor solution of step (a) can have a dysprosium oxide concentration of about 25 to 75 g/L.

The dysprosium precursor solution is heated in step (b) to form a precipitate. The heating can be conducted at a temperature of about 100° C. to 350° C. and for from about 15 mins to 24 hours. In certain embodiments, the heating can be conducted at a temperature of about 120° C. to 160° C. and for from about 45 min to 2 hours. The heating provides a crystalline precipitate. In particular, the heating can provide a single crystalline precipitate.

The crystalline precipitate from the heating process of step (b) can be washed with water to remove residual quantities of bound or adsorbed ions, such as nitrates and chlorides, and then dewatered with an appropriate solvent, such as ethanol, before calcining. In certain embodiments, the crystalline precipitate is particularly pure in anionic impurities, as characterized by a conductivity of less than about 10 mS/cm after washing.

The crystalline precipitate is calcined in step (c) to result in $Dy_2O_3$ particles as disclosed and described herein. The calcining can be conducted at a temperature ranging from about 400° C. to 1000° C. and for from about 15 mins to 24 hours. The calcining should be sufficient to remove the polymeric additive and the chelating agent. In certain embodiments the calcining can be conducted at a temperature of from about 600° C. to 800° C. and for from about 1 to 4 hours.

The calcining results in the $Dy_2O_3$ particles with the properties as set forth herein. Similar to the precipitate of step (b), the calcined products can exhibit a single crystalline SAED (selected area (electron) diffraction).

Calcining can be conducted in any way that results in a uniform material.

For Particle Size Dispersion measurements (PSD) as referenced herein, about 0.1 g of powder was dispersed in 10 mL of 2% Sodium Hexametaphosphate by sonication for 3 minutes. The PSD measurement was then conducted with Microtrac S3500. The sample solution was dropped into the sample delivery controller filled with DI water followed by 3 minute sonication. The solution was then flowed through a transparent cell at a flow rate of 49 mL/sec (75% flow rate). Signals are captured and sample particle size was calculated by the machine.

FIG. 1 is a flow chart for an embodiment of a process of producing moderately dispersed $Dy_2O_3$ particles.

FIGS. 2 and 3 shows typical morphology of claimed $Dy_2O_3$ by A) SEM or B) Microtrac.

In the following, Examples are given to illustrate the inventive method for the preparation of $Dy_2O_3$ particles and characterization thereof in more detail, although the scope of the invention is never limited thereby in any way.

EXAMPLES

Example 1: Synthesis of Nano-$Dy_2O_3$

The following was done:
1) The polymeric additive PVA and chelating agent diethanolamine are weighed and subsequently dissolved in water with heating at 50° C.
2) A stock solution of $DyCl_3$ (415 g/L, 2.225 M) was added to the above mixture to a final concentration of 0.4 M (74.6 g/L).

3) The solution is poured into an autoclave teflon liner and the autoclave was heated to 160° C. and held at this temperature for 1 hour.

4) The result was a viscous white material (wetcake/precipitate).

5) The wetcake was then centrifuged and the supernatant removed. Subsequently, the wetcake was washed with deionized water to a conductivity of less than 8 mS/cm.

6) The wetcake was dewatered by washing with ethanol two times.

7) The wetcake was calcined at 700° C. for 2 hours.

Figure 2A:
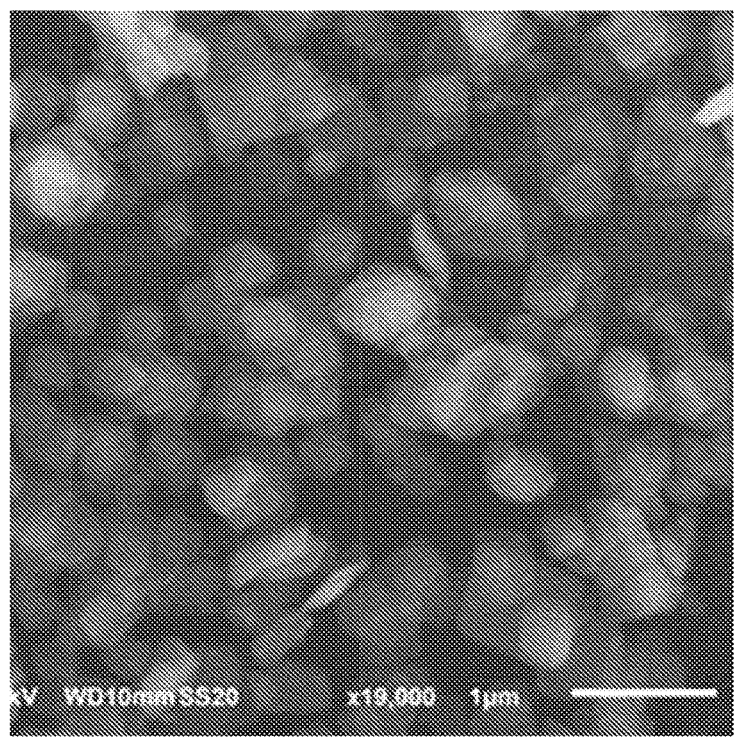
FIG. 2A is a SEM of nano $Dy_2O_3$ made by a chloride precursor/hydrothermal process.
Figure 2B:
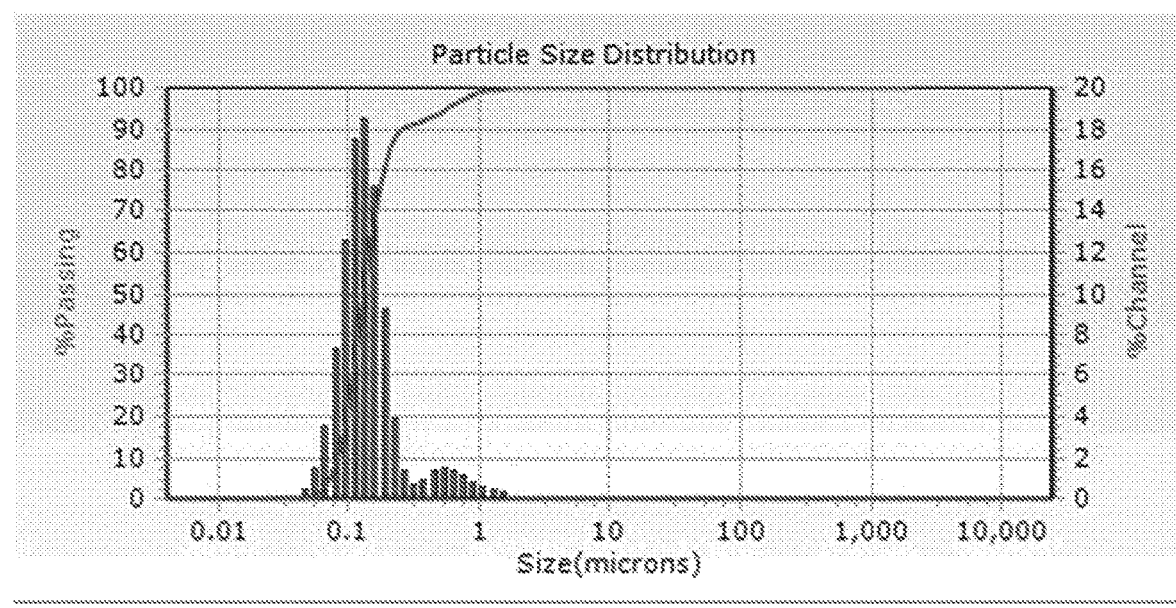
FIG. 2B is a graph of particle size distribution of nano $Dy_2O_3$ made by the chloride precursor/hydrothermal process.

As examined with a scanning electron microscope, the dysprosium oxide comprised discrete non-agglomerated particles with round and faceted morphology (FIG. 2A). PSD of the $Dy_2O_3$ shows particles with a $D_{50}$ value of 0.13 μm (FIG. 2B). TEM and SAED of the $Dy_2O_3$ showed the material to possess a single crystalline structure.

Example 2: Synthesis of Nano-$Dy_2O_3$

The following was done:

1) 8 g/L PVP (MW=40K) and PVP (MW=1300K), 0.06M of aminohexanoic acid and 0.8M of DEA were dissolved in water.

2) A stock solution of $Dy(NO_3)_2$ (415 g/L, 2.225 M) was added to the above mixture to a final concentration of 0.4 M (74.6 g/L).

3) The solution was then poured into an autoclave teflon liner and heated to 160° C. and kept at this temperature for 1 hour.

4) The result was a viscous white material (wetcake/precipitate).

5) The wetcake was centrifuged, and the supernatant removed. The remaining material was washed with deionized water to a conductivity of less than 8 mS/cm.

6) The wetcake was then dewatered by washing with ethanol two times and centrifuged to obtain the final wetcake.

7) The wetcake was calcined at 700° C. for 2 hours.

Figure 3A:
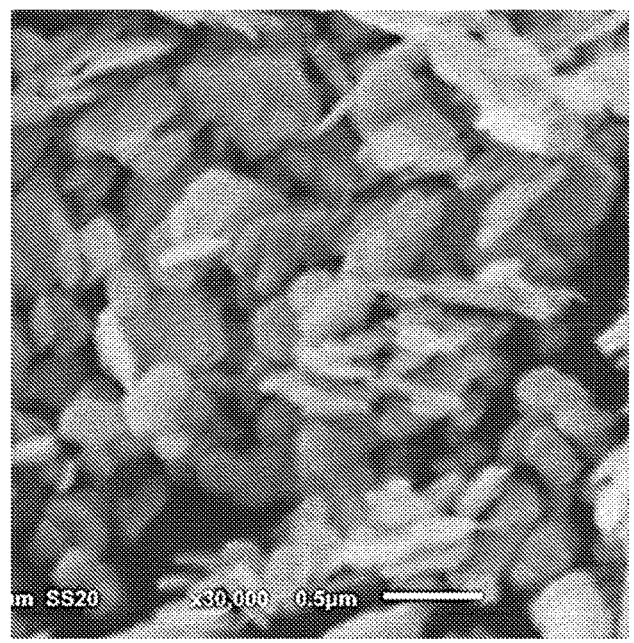
FIG. 3A is a SEM of nano $Dy_2O_3$ made by a nitrate precursor/hydrothermal process. These particles were made using aminohexanoic acid as the chelating agent and polyvinylpyrrolidone (PVP) as the polymeric additive.
Figure 3B:
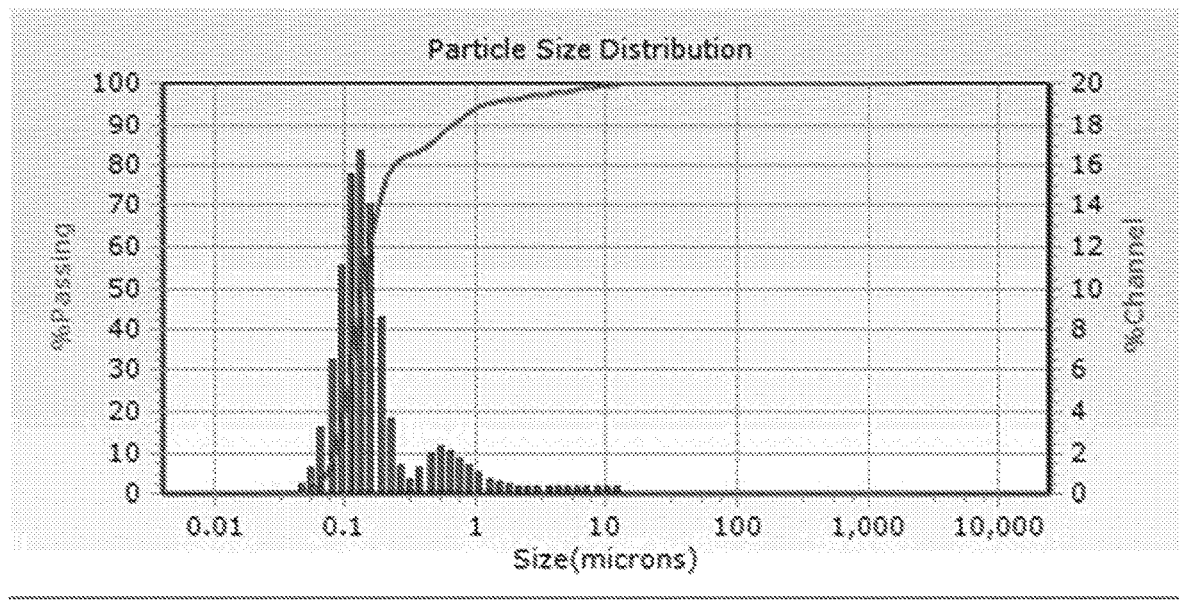
FIG. 3B is a graph of particle size distribution of nano $Dy_2O_3$ made by a nitrate precursor/hydrothermal process and the chelating agent and polymeric additive as described for FIG. 3A.

SEM of the resultant dysprosium oxide showed that it comprised discrete non-agglomerated particles with flat morphology and length of less than 500 nm (FIG. 3A). PSD of the resultant $Dy_2O_3$ showed that the particles had a $D_{50}$ of 0.137 μm (FIG. 3B).

Comparative Example 3: Synthesis of $Dy_2O_3$

The following was done:

1) 1083 ml of 4.5M $NH_4OH$ was prepared.

2) A stock solution of 900 ml of $Dy(NO_3)_3$ (100 g/L, 2.225 M) was prepared and added to the above ammonia solution to a final concentration of 0.4 M (74.6 g/L).

3) The solution was stirred at room temperature for 1 hour.

4) The final pH was 9.90 and the temperature was 24.1° C.

5) The precipitates were collected by decanting the supernatant and replenishing with deionized water several times until the conductivity of filtrate is less than 8 mS/cm.

6) Two-thirds of the precipitates obtained from step 5 were dewatered with ethanol and dispersed in a total volume of 600 ml ethanol.

7) The slurry was subjected to drying at 300° C. and 130-140 bar.

8) The resultant oxide was calcined at 700° C. for 2 hours.

Figure 4A:
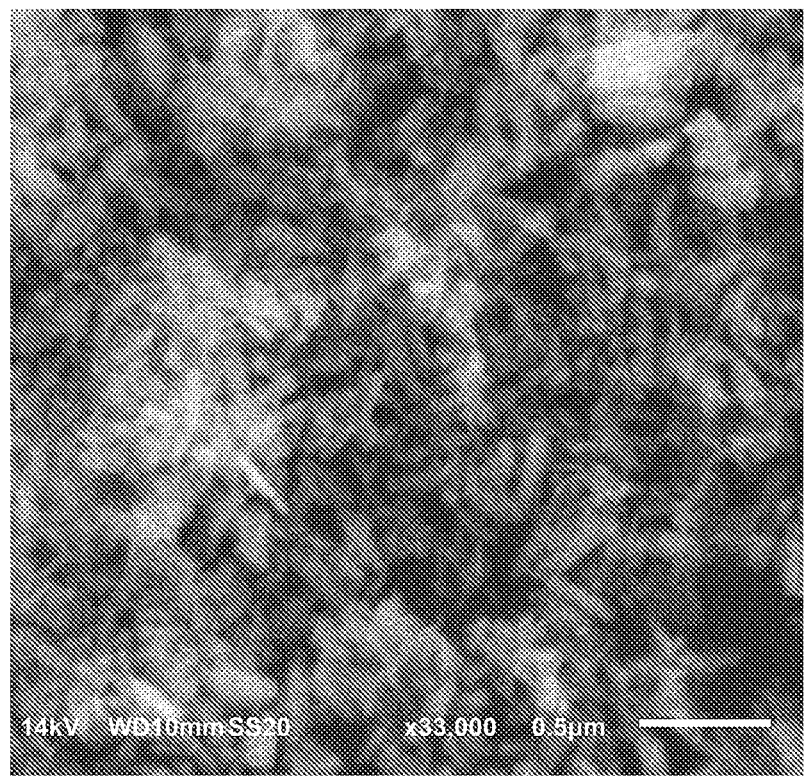
FIG. 4A is a SEM of $Dy_2O_3$ synthesized using a nitrate precursor which involved precipitation at room temperature followed by a supercritical drying process, as described in Comparative Example 1.
Figure 4B:
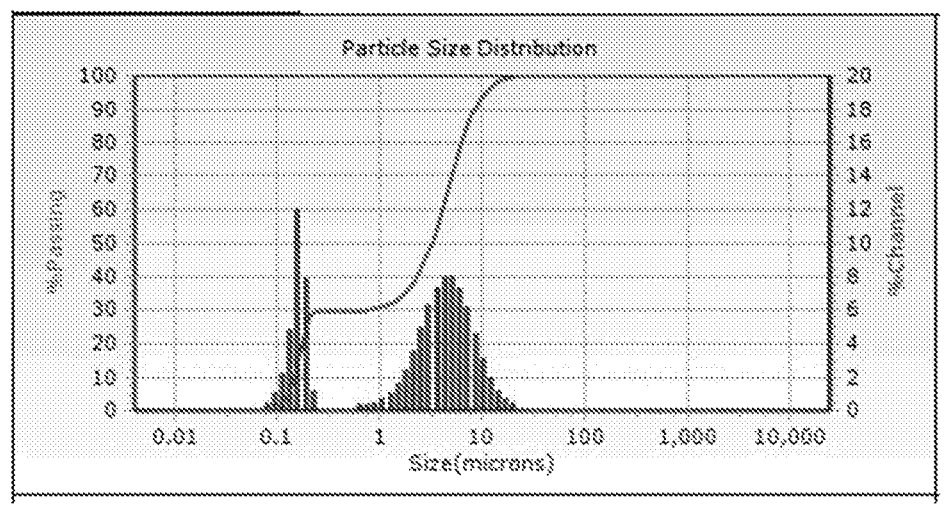
FIG. 4B is a graph of particle size distribution of $Dy_2O_3$ as described for FIG. 4A and in Comparative Example 1.

The resultant $Dy_2O_3$ consisted of agglomerated fine needle-like particles (FIG. 4A). PSD of the material showed that it was comprised of particles with a $D_{50}$ of 3.181.1 m (FIG. 4B).

Comparative Example 4: Synthesis of $Dy_2O_3$

The following was done:

1) Steps 1-5 of Comparative Example 1 were followed.

6) One-third of the precipitates obtained were dewatered with isopropanol and dispersed in a total volume of 500 ml isopropanol.

7) The slurry was heated to 80° C. for 24 hours.

8) The resultant wetcake was calcined at 700° C. for 2 hours.

Figure 5A:
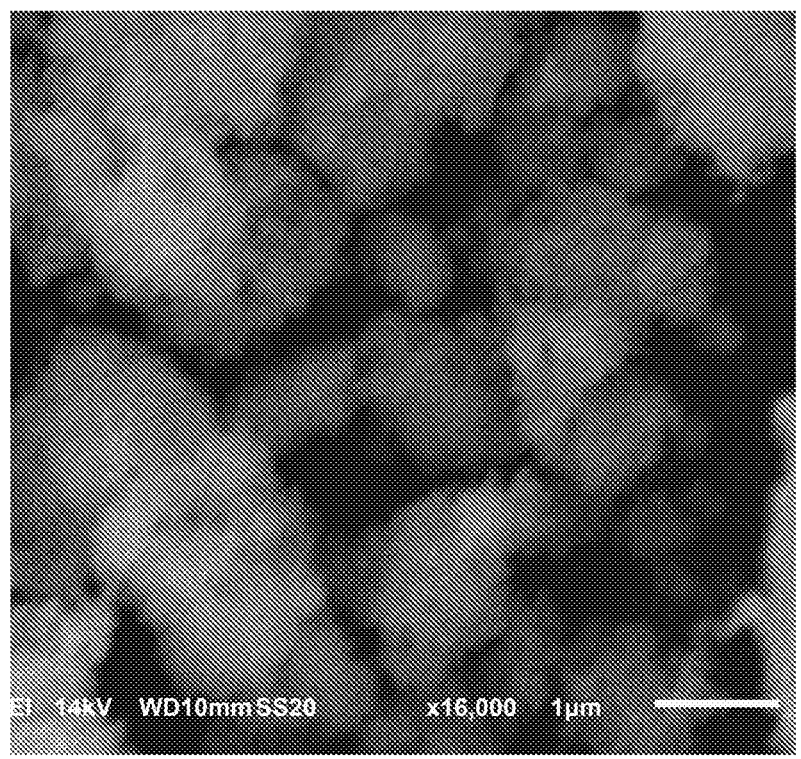
FIG. 5A is a SEM of $Dy_2O_3$ synthesized using nitrate precursor which involved precipitation at room temperature followed by heating in isopropanol, as described in Comparative Example 2.
Figure 5B:
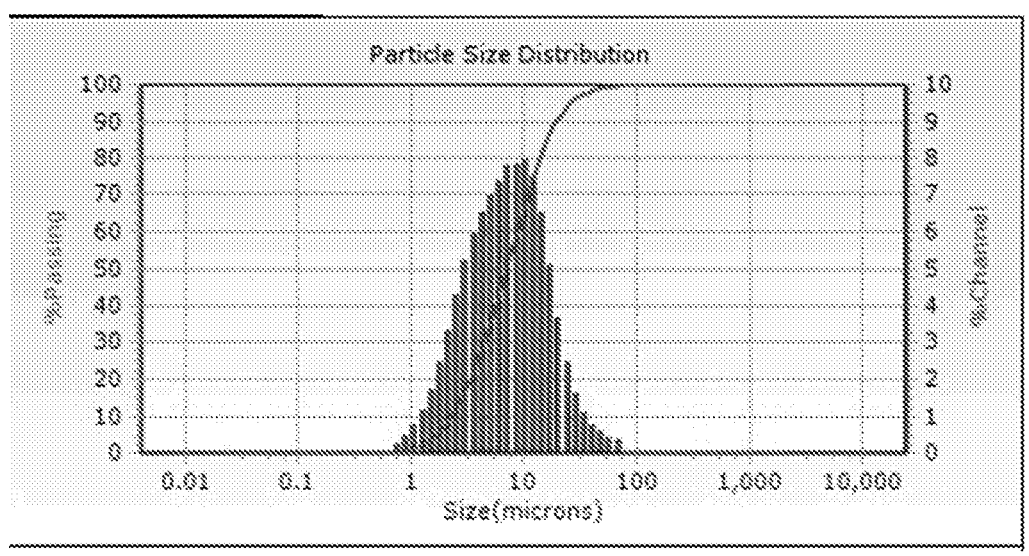
FIG. 5B is a graph of particle size distribution of $Dy_2O_3$ as described for FIG. 3E and in Comparative Example 2.

The resultant $Dy_2O_3$ consisted of large irregular agglomerates of chunks and clusters (FIG. 5A). PSD of these agglomerates showed that they had a $D_{50}$ of 7.08 μm (FIG. 5B).

Comparative Example 5: Synthesis of $Dy_2O_3$

The following was done:

1) 120 ml of 4.5M $NH_4OH$ was prepared; 5 g of Lauric acid was dissolved in this ammonia solution.

2) A stock solution of 100 ml of $Dy(NO_3)_3$ (100 g/L, 2.225 M) was prepared and added to the above mixture.

3) The solution is stirred at room temperature for 1 hour.

4) The final pH was 9.73 and the temperature was 21.8° C.

5) The precipitates were collected by decanting the supernatant and replenishing with deionized water several times until the conductivity of filtrate is less than 8 mS/cm.

8) The wetcake was collected by suction filtration using a Buchner funnel.

9) The resultant wetcake was calcined at 700° C. for 2 hours.

Figure 6A:
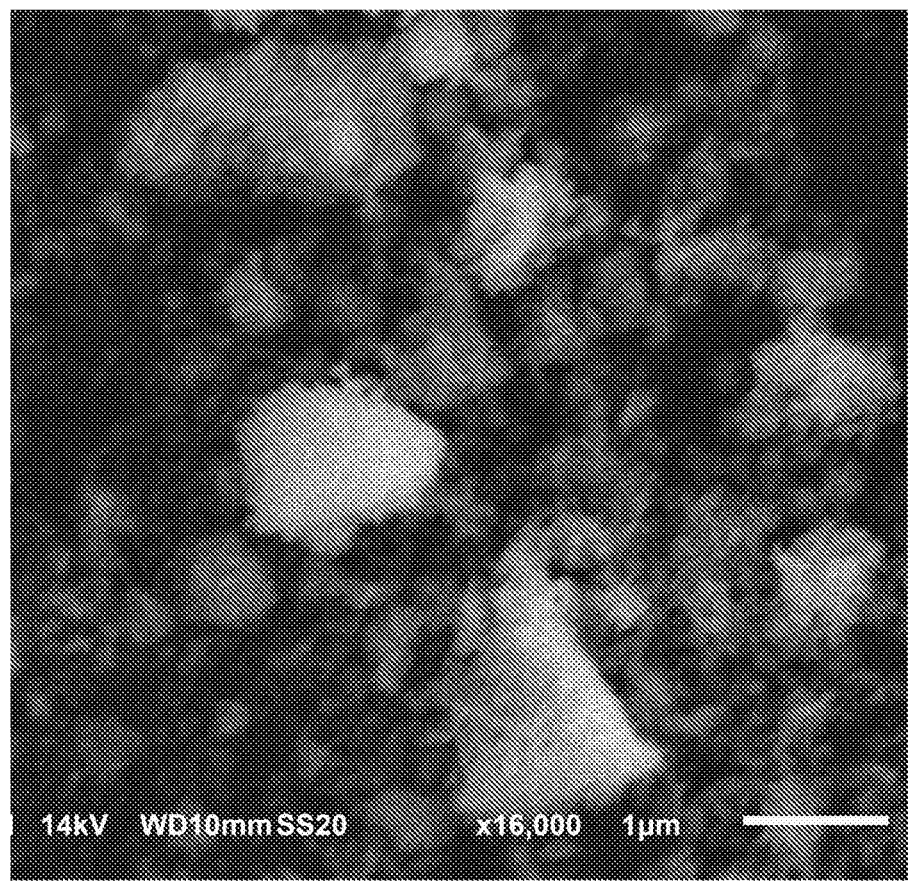
FIG. 6A is a SEM of $Dy_2O_3$ synthesized using nitrate precursor which involved precipitation at room temperature in the presence of carboxylic acid, as described in Comparative Example 3.
Figure 6B:
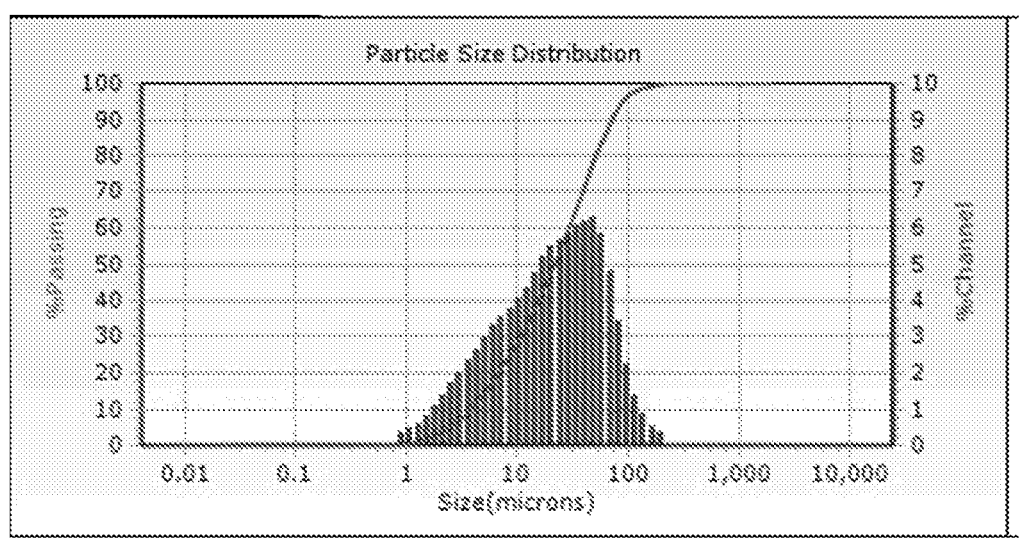
FIG. 6B is a graph of particle size distribution of $Dy_2O_3$, as described for FIG. 3G and in Comparative Example 3.
Figure 9:
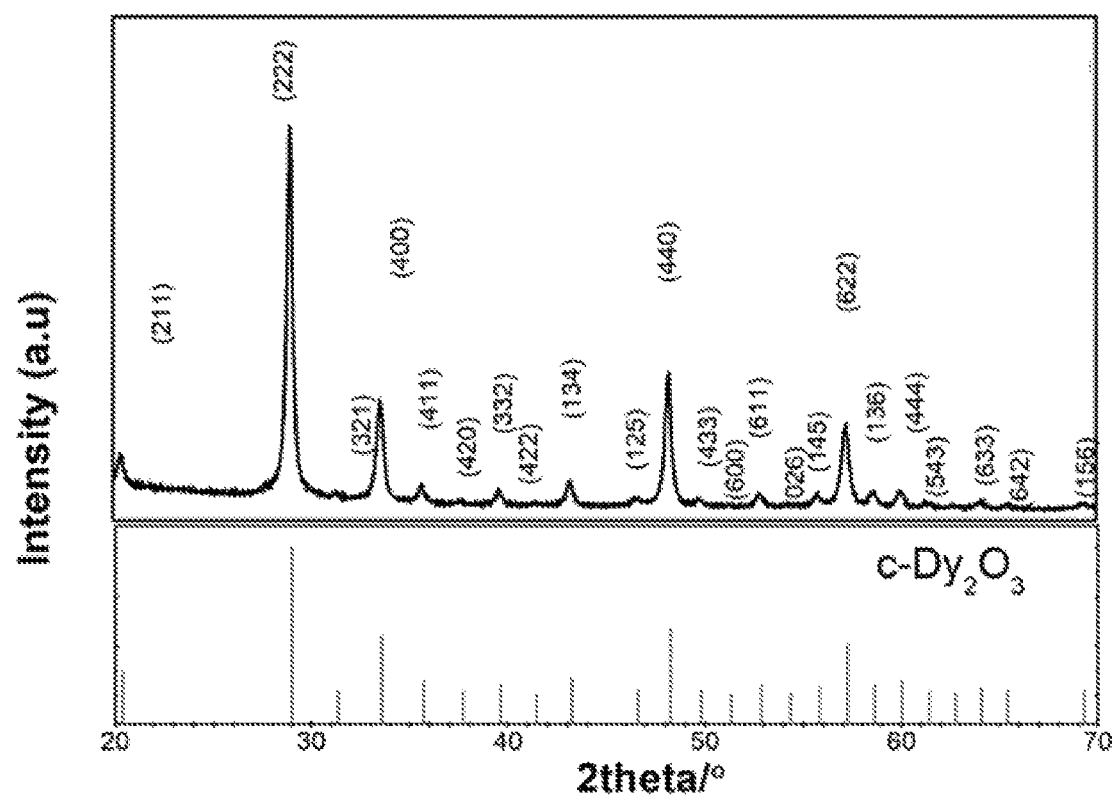
FIG. 9 is an x-ray diffractogram of calcined $Dy_2O_3$.

Clusters of agglomerates of various sizes of $Dy_2O_3$ resulted (FIG. 6A). PSD showed they had a $D_{50}$ of 21.54 μm (FIG. 6B).

Example 6—Forming a Multi-Layer Ceramic Capacitor Using Moderately Dispersed $Dy_2O_3$ Particles 1. Mix the moderately dispersed $Dy_2O_3$ particles as prepared herein with barium titanate powder (main ingredient) and other raw material powders (e.g. MgO, $Y_2O_3$, $V_2O_5$, $Ho_2O_3$).
2. Subject the powder mixture to wet mixing in a mixed solvent system of polyvinyl butyral (PVB) resin solution, toluene and ethanol to form a ceramic slurry. Next, cast the slurry into ceramic green sheets using the doctor blade method.
3. Imprint the ceramic green sheets with an internal electrode pattern, then laminate on each of the upper and lower sheet surfaces.
4. Compact the ceramic green sheets together using a pressing machine, then cut the resultant sheet laminate into a specific size.
5. Fire the sheet laminate for 2 hours at 1120 to 1135° C. to form the capacitor main body, then apply an external electrode paste containing Cu powder and glass to both ends of the fired capacitor main body and print at 850° C. to form the external electrode.
6. Employ an electrolytic barrel machine to plate Ni and Sn successively, thereby producing a multi-layer ceramic capacitor.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the compositions and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A composition comprising non-agglomerated, moderately dispersed $Dy_2O_3$ particles having regular morphology and lateral size ranging from about 10 nm to 1 μm, wherein "moderately dispersed" means $Dy_2O_3$ particles having a polydispersity index value of from 0.1 to 0.4.

2. The composition of claim 1, wherein the lateral size ranges from about 40 nm to 1 μm.

3. The composition of claim 1, wherein the lateral size ranges from about 100 nm to 1 μm.

4. The composition of claim 1, wherein the particles have a particle size distribution wherein both $D_{10}$ and $D_{90}$ are is about 0.1 μm to 1 μm.

5. The composition of claim 1, wherein the particles have a $D_{10}$ of about 10 nm to 100 nm, a $D_{50}$ of about 0.1 μm to about 0.8 μm, and a $D_{90}$ of about 0.25 μm to 1 μm.

6. The composition of claim 1, wherein the particles are spheres, ovals, or cubes.

7. The composition of claim 1 comprising about 0 to 50 ppm chloride.

8. The composition of claim 1, wherein the particles have a single cubic phase.

9. The composition of claim 1, wherein the particles have a $D_{50}$ of about 10 nm to about 0.2 μm and a $D_{90}$ of about 0.2 μm to 1 μm.

10. The composition of claim 1, wherein the particles have a $D_{50}$ of about 10 nm to about 0.15 μm and a $D_{90}$ of about 0.2 μm to 0.75 μm.

11. The composition of claim 1, wherein the particles are round or faceted.

12. The composition of claim 1, wherein the particles are crystalline.

* * * * *